(12) United States Patent
Gall

(10) Patent No.: US 10,603,728 B2
(45) Date of Patent: Mar. 31, 2020

(54) RECIPROCATING SAW

(71) Applicant: MILWAUKEE ELECTRIC TOOL CORPORATION, Brookfield, WI (US)

(72) Inventor: Simon M. Gall, Cedarburg, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 164 days.

(21) Appl. No.: 15/869,203

(22) Filed: Jan. 12, 2018

(65) Prior Publication Data

US 2018/0193932 A1 Jul. 12, 2018

Related U.S. Application Data

(60) Provisional application No. 62/445,291, filed on Jan. 12, 2017.

(51) Int. Cl.
| | |
|---|---|
| *B23D 51/16* | (2006.01) |
| *B23D 51/01* | (2006.01) |
| *F16H 21/36* | (2006.01) |
| *B25F 5/02* | (2006.01) |
| *B23D 51/10* | (2006.01) |
| *B23D 49/16* | (2006.01) |
| *F16H 1/14* | (2006.01) |

(52) U.S. Cl.
CPC ............ *B23D 51/16* (2013.01); *B23D 49/16* (2013.01); *B23D 51/01* (2013.01); *B23D 51/10* (2013.01); *B25F 5/02* (2013.01); *F16H 21/36* (2013.01); *F16H 1/14* (2013.01)

(58) Field of Classification Search
CPC ........ B23D 51/16; B23D 51/01; B23D 51/10; B25F 5/02; F16H 21/36; Y10T 74/18256
See application file for complete search history.

(56) References Cited

U.S. PATENT DOCUMENTS

| | | | | |
|---|---|---|---|---|
| 2,713,271 | A | * | 7/1955 | Dodegge ............ B23D 49/162 74/50 |
| 5,132,653 | A | * | 7/1992 | Nakatake ............ H01H 51/065 200/293 |
| 5,946,764 | A | * | 9/1999 | Tworzydlo ........... B60S 1/3806 15/250.201 |

(Continued)

FOREIGN PATENT DOCUMENTS

| | | |
|---|---|---|
| DE | 3828785 | 4/1989 |
| EP | 2785485 | 6/2016 |

OTHER PUBLICATIONS

International Preliminary Report on Patentability for Application No. PCT/US2018/013438, dated Jul. 16, 2019, 10 pages.

*Primary Examiner* — Thomas C Diaz
(74) *Attorney, Agent, or Firm* — Michael Best & Friedrich LLP

(57) ABSTRACT

A power tool including a housing having a handle configured to be grasped by a user, a motor supported by the housing, a driving gear rotated by the motor, and a driven gear engaging the driving gear to be rotated by the driving gear about a rotation axis. The power tool also includes a pin extending from the driven gear and offset from the rotation axis and a spindle having a yoke coupled to the pin to translate rotation of the driven gear into reciprocating motion of the spindle. A notch is formed in an outer periphery of the yoke to provide clearance for the driving gear as the spindle is driven by the pin.

12 Claims, 6 Drawing Sheets

(56) References Cited

U.S. PATENT DOCUMENTS

| | | | |
|---|---|---|---|
| 6,881,151 B1 * | 4/2005 | Jantz | F16D 3/385 |
| | | | 464/128 |
| 8,407,902 B2 | 4/2013 | Naughton et al. | |
| 8,636,081 B2 | 1/2014 | Ludy et al. | |
| 9,061,411 B2 | 6/2015 | Naughton et al. | |
| 9,132,491 B2 | 9/2015 | Alberti et al. | |
| 9,221,112 B2 | 12/2015 | Kehoe et al. | |
| 9,233,427 B2 | 1/2016 | Alberti et al. | |
| 9,289,890 B2 | 3/2016 | Ludy et al. | |
| 2010/0275452 A1 | 11/2010 | Saegesser et al. | |
| 2011/0107608 A1 | 5/2011 | Wattenbach et al. | |
| 2012/0291294 A1 | 11/2012 | Middleton et al. | |
| 2013/0019483 A1 | 1/2013 | Naughton et al. | |
| 2013/0133210 A1 | 5/2013 | Weir et al. | |
| 2013/0174428 A1 * | 7/2013 | Naughton | B23D 49/11 |
| | | | 30/392 |

* cited by examiner

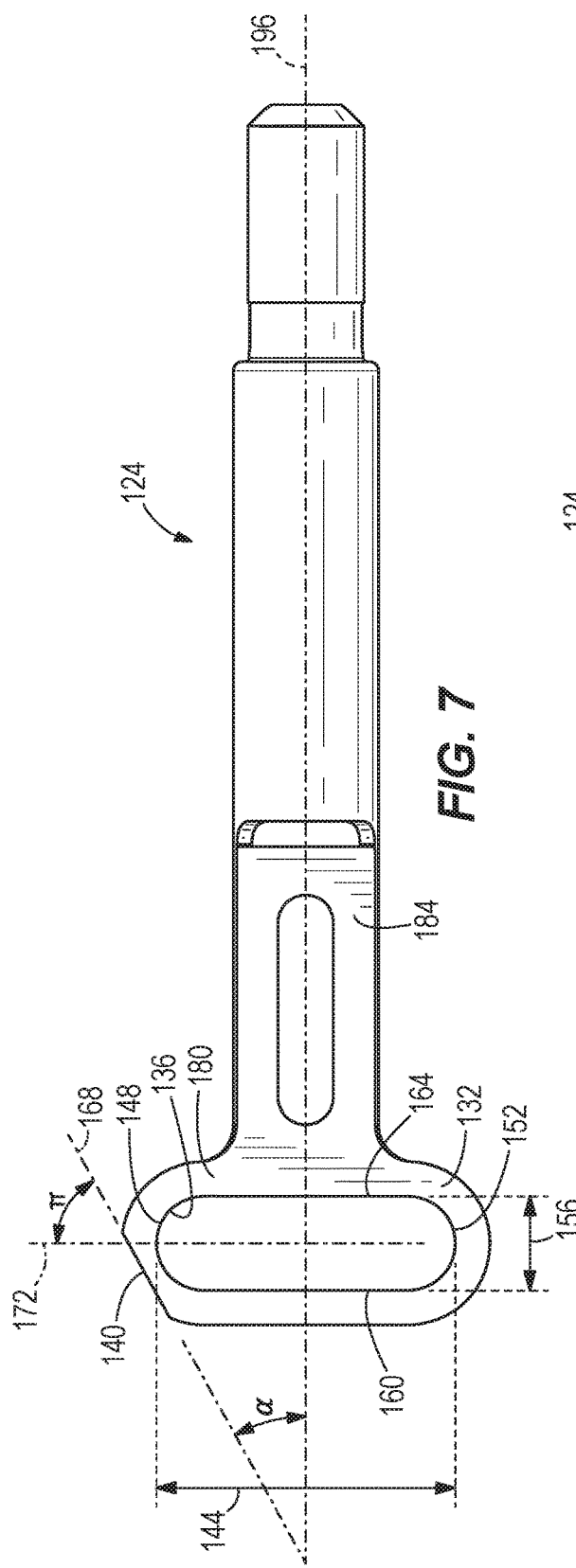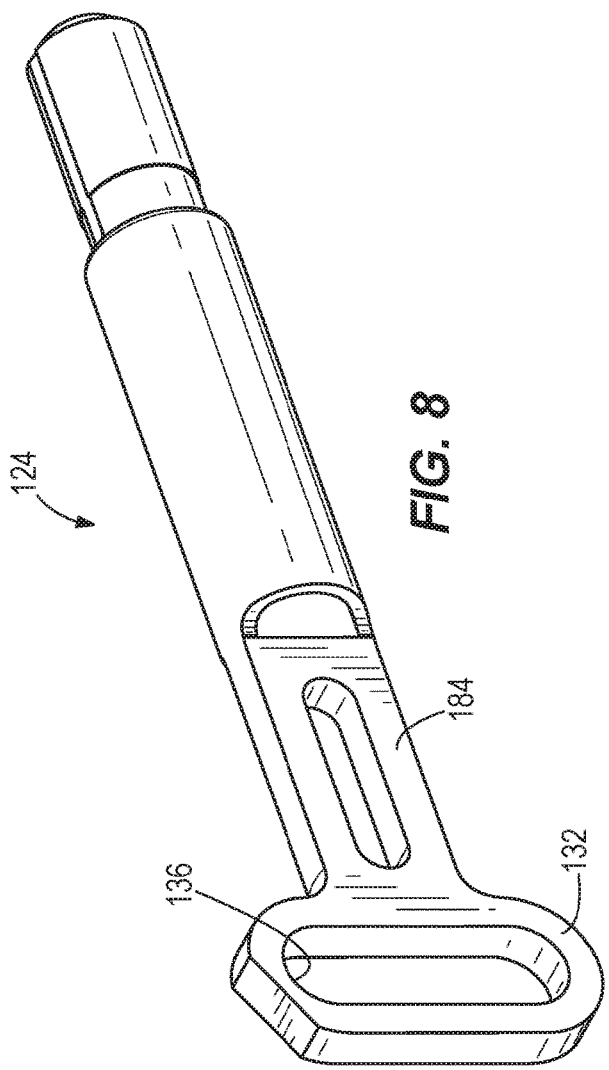

RECIPROCATING SAW

CROSS-REFERENCE TO RELATED APPLICATIONS

This application claims priority benefit to U.S. Provisional Application No. 62/445,291, filed Jan. 12, 2017, the entire contents of which are hereby incorporated by reference.

BACKGROUND

The present application relates to a power tool. In particular, the present application relates to a reciprocating saw. Reciprocating saws are used to cut a variety of objects made from a variety of materials, such as metal pipes, wood and dry wall. A cordless, compact reciprocating saw allows for cutting operations in tight spaces or awkward angles for plumbing, electrical, remodeling and HVAC applications.

SUMMARY

In one embodiment, the invention provides a power tool including a housing having a handle configured to be grasped by a user, a motor supported by the housing, a driving gear rotated by the motor, and a driven gear engaging the driving gear to be rotated by the driving gear about a rotation axis. The power tool also includes a pin extending from the driven gear and offset from the rotation axis and a spindle having a yoke coupled to the pin to translate rotation of the driven gear into reciprocating motion of the spindle. A notch is formed in an outer periphery of the yoke to provide clearance for the driving gear as the spindle is driven by the pin.

In another embodiment, the invention provides a power tool including a housing having a handle configured to be grasped by a user, a motor supported by the housing, a driving gear rotated by the motor, and a driven gear engaging the driving gear to be rotated by the driving gear about a rotation axis. The power tool also includes a pin extending from the driven gear and offset from the rotation axis and a spindle having a yoke coupled to the pin to translate rotation of the driven gear into reciprocating motion of the spindle. The spindle defines a spindle axis, and the yoke includes a notch that is offset from the spindle axis. The notch provides clearance for the driving gear as the spindle is driven by the pin.

In another embodiment, the invention provides a housing having a handle configured to be grasped by a user, a motor supported by the housing, a driving gear rotated by the motor, a first driven gear engaging the driving gear to be rotated by the driving gear about a rotation axis and a second driven gear facing the first driven gear and engaging the driving gear to be rotated by the driving gear about the rotation axis. The second driven gear defines a channel. The power tool also includes a pin extending from the first driven gear and offset from the rotation axis. The pin has an end received in the channel of the second driven gear. The power tool also includes a spindle having a yoke coupled to the pin to translate rotation of the first and second driven gears into reciprocating motion of the spindle.

BRIEF DESCRIPTION

FIG. 7 is a side view of a spindle of the reciprocating saw of FIG. 1.

FIG. 8 is a perspective view of the spindle of FIG. 7.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

A portable power tool 10 is shown in FIGS. 1-3B. In these embodiments, the power tool 10 is a reciprocating saw. In the illustrated embodiments, the saw 10 is powered by a power tool battery pack 14. The battery pack 14 may be configured to connect and power a variety of tools in addition to the reciprocating saw 10. In other embodiments, the saw 10 may be a corded power tool. In still other embodiments, the power tool may be another hand-held power tool, such as, for example, another type of power tool that translates rotary motion into reciprocating motion.

Figure 1:
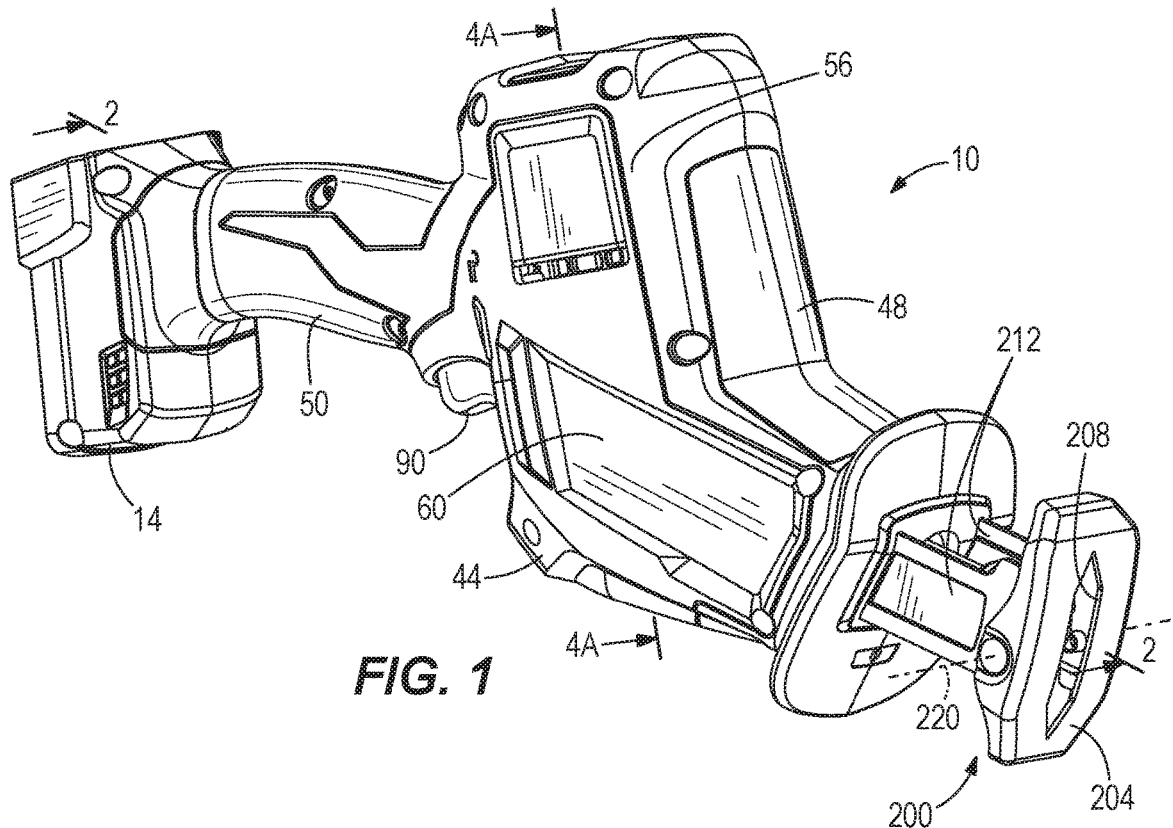
FIG. 1 is a perspective view of a reciprocating saw according to one embodiment of the invention.
Figure 2:
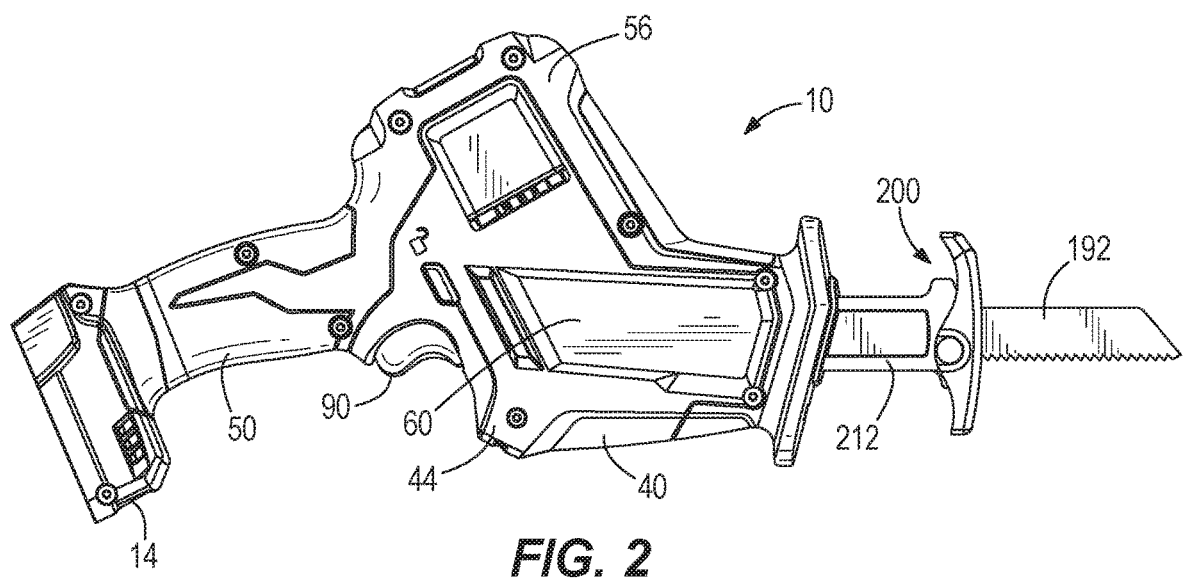
FIG. 2 is a side view of the reciprocating saw shown in FIG. 1.

The saw 10 includes a housing 40. As shown in FIG. 1, the housing 40 has a first housing portion 44 and a second housing portion 48. Each housing portion 44, 48 is formed of plastic; however, in some embodiments, the housing portions 44, 48 may be formed of other materials. The housing 40 defines a handle 50, a motor housing portion 56, and a gear case housing portion 60. The handle 50 includes at least one grip surface configured to be grasped by a user. In the illustrated embodiments, the handle 50 can also define a battery receiving portion 64 (FIGS. 3A and 3B) for receiving the battery pack 14. In other embodiments, the battery receiving portion 64 may be defined elsewhere within the housing 40. The motor housing portion 56 supports a motor 68 (FIGS. 3A and 3B), and the gear case housing portion 60 in turn supports a gear case (FIGS. 2 and 3). The gear case includes first and second gear case portions 76, only one of which is shown in FIGS. 3A and 3B.

Figure 3A:
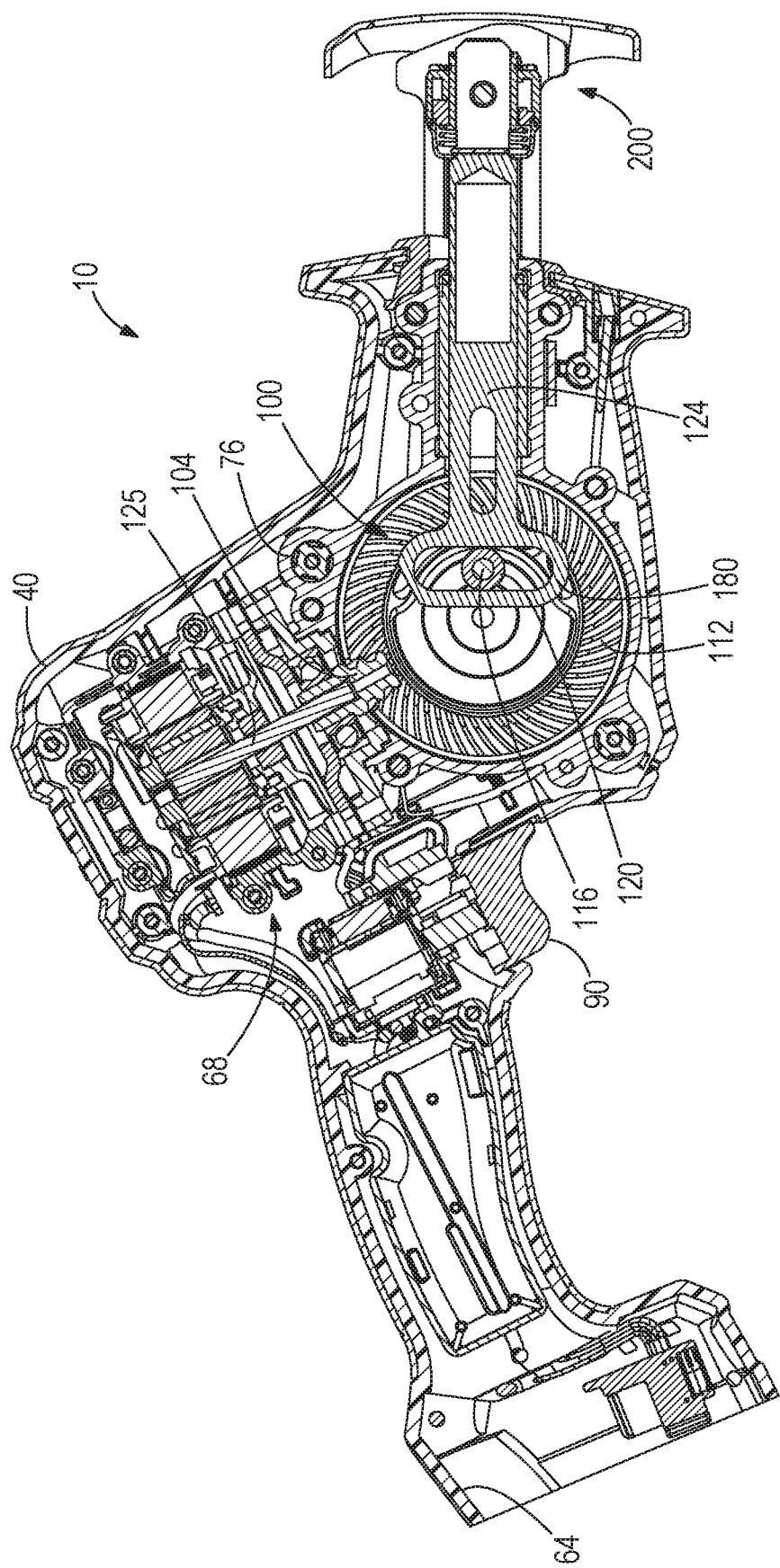
FIG. 3A is a cross-sectional view of the reciprocating saw of FIG. 1.
Figure 3B:
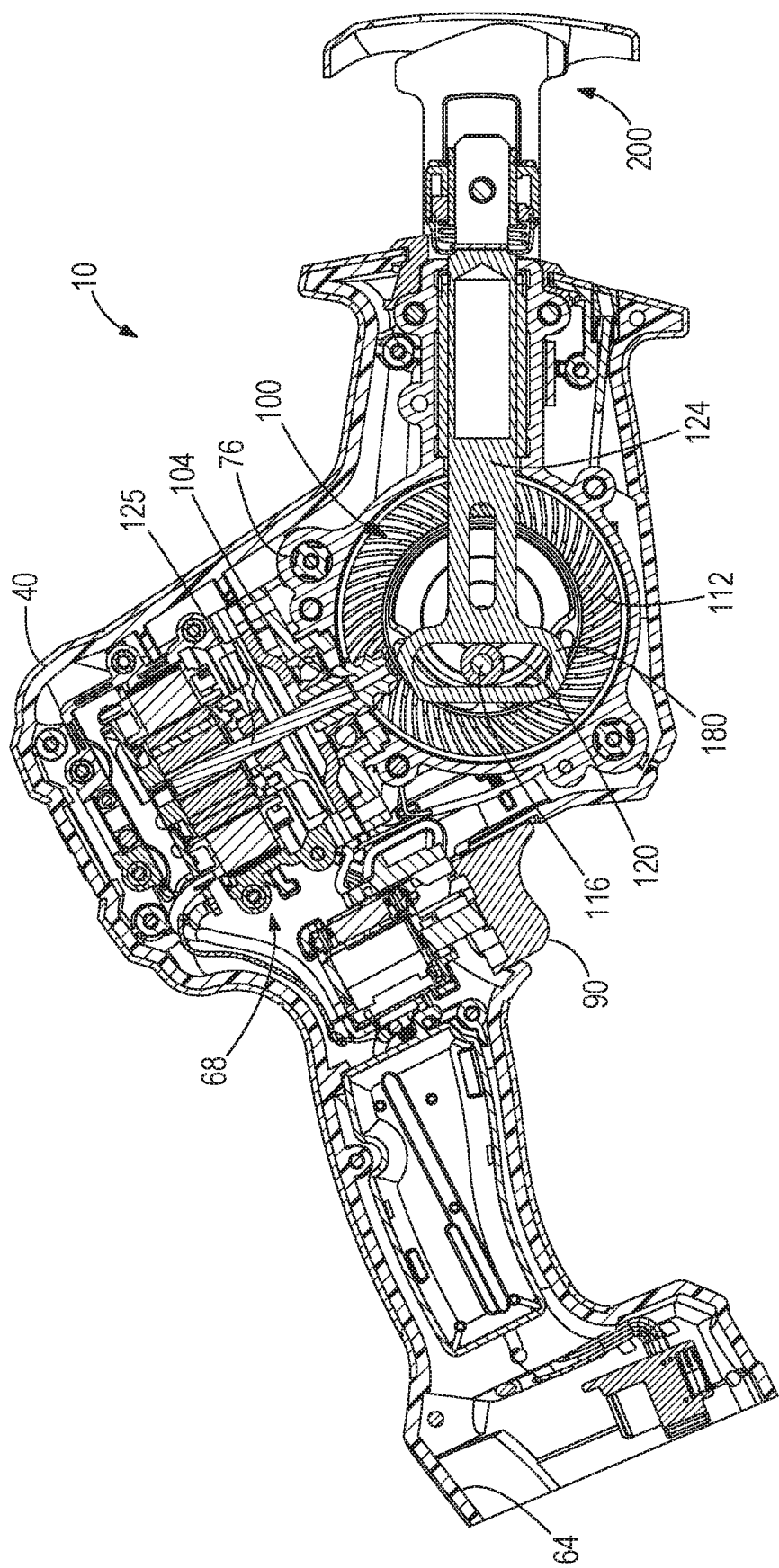
FIG. 3B is another cross-sectional view of the reciprocating saw of FIG. 1.

As shown in FIGS. 3A and 3B, the battery receiving portion 64 is configured as a cavity. When the battery pack 14 (FIG. 1) is connected to the saw 10, the pack 14 is inserted into the cavity and substantially closes the cavity. As shown in FIGS. 1-3B, an actuator 90 is positioned on the handle 50 for powering the saw 10. In particular, the actuator 90 is electrically coupled to the battery pack 14 and the motor 68 to selectively energize the motor 68 when actuated. As illustrated, the actuator 90 is an on/off trigger. In other embodiments, the switch 90 may be a variable speed trigger, a two speed trigger, a push button or another suitable actuator.

Referring to FIGS. 3A-4B, the first and second gear case portions 76 enclose a drive system 100 for the saw 10. In this embodiment, the drive system 100 is a scotch yoke mechanism. The drive system 100 includes a driving gear 104, a first driven gear 108, a second driven gear 112, a pin 116, a bushing 120, and a spindle 124. The driving gear 104 is coupled to an output shaft 125 of the motor 68 for rotation with the output shaft 125. The illustrated driving gear 104 is an output spindle having a tapered or frustoconically-shaped outer surface. More particularly, the illustrated driving gear 104 is a spiral bevel pinion.

Figure 4A:
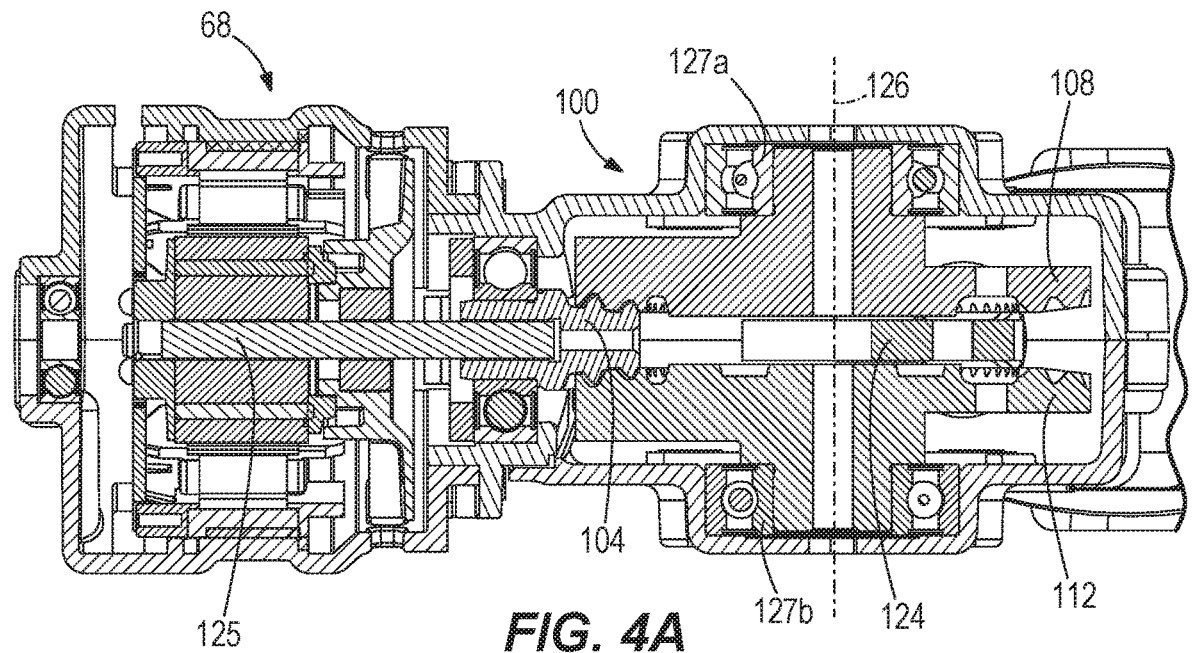
FIG. 4A is a detailed view of a portion of the reciprocating saw of FIG. 1.
Figure 4B:
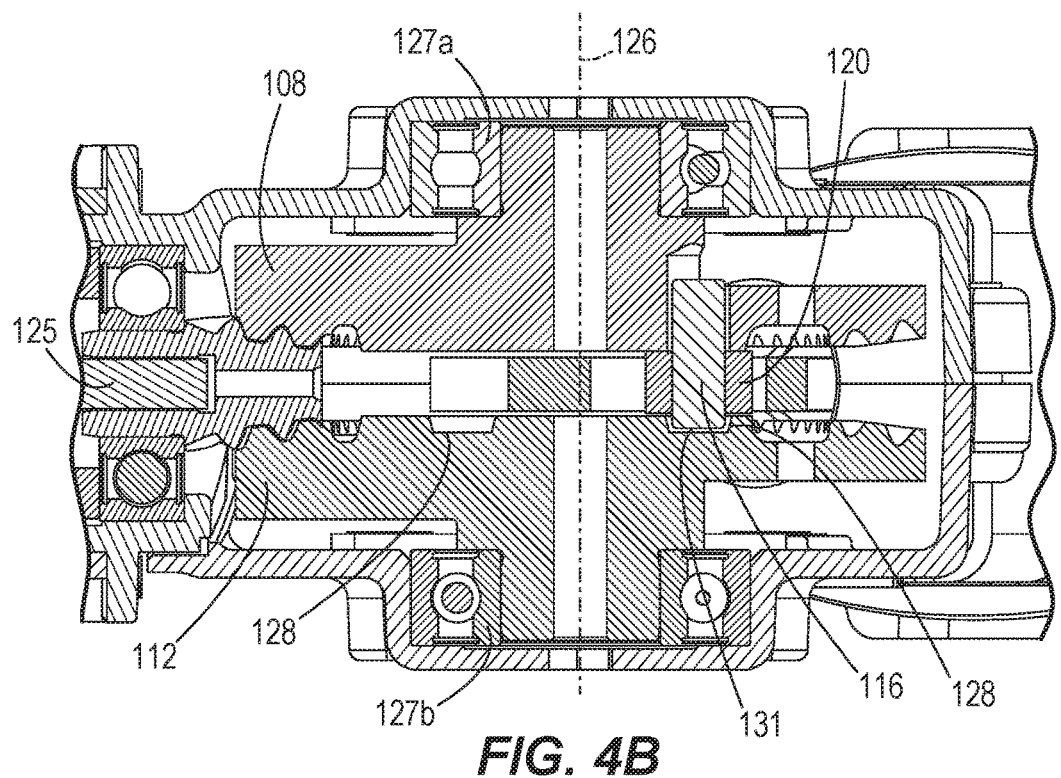
FIG. 4B is a detailed view of another portion of the reciprocating saw of FIG. 1.
Figure 5:
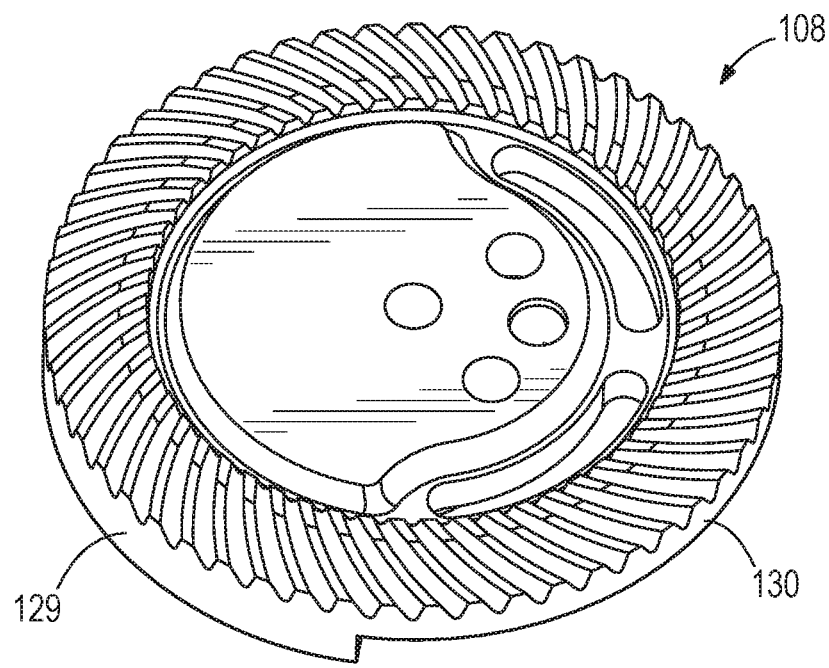
FIG. 5 is a perspective view of a gear of the reciprocating saw of FIG. 1.
Figure 6:
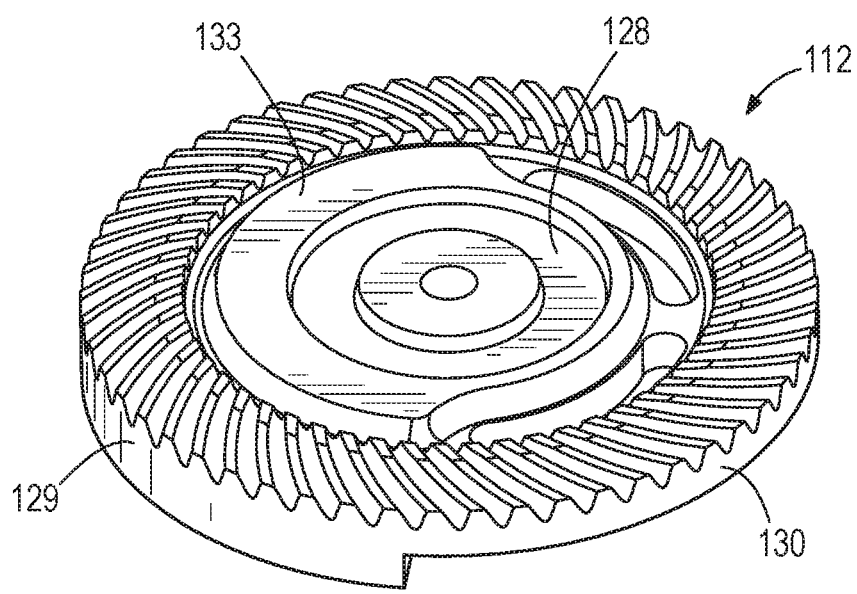
FIG. 6 is a perspective view of another gear of the reciprocating saw of FIG. 1.

Further with respect to FIGS. 4A and 4B, the first and second driven gears 108, 112 are positioned on opposing sides of the driving gear 104. The first and second driven gears 108, 112 both engage the driving gear 104 to be rotated about a rotation axis 126. Each driven gear 108, 112 is supported by a bearing 127a, 127b for rotation relative to the housing 40. The bearings 127a, 127b may be press-fit or otherwise secured within recesses formed in the housing portions 44, 48. As shown in FIGS. 5 and 6, the illustrated first driven gear 108 is a first bevel gear, and the second driven gear 112 is a second bevel gear. More particularly, the first and second driven gears 108, 112 are spiral bevel gears. Each driven gear 108, 112 includes a relatively thick portion 129 and a relatively thin portion 130 that function as counterbalance weights during rotation of the gears 108, 112.

Referring back to FIGS. 3A-4B, the pin 116 extends from the first driven gear 108 toward the second driven gear 112. The pin 116 is offset from the rotation axis 126 of the driven gears 108, 112. In the illustrated embodiment, the pin 116 is a separate element that is secured (e.g., press-fit, etc.) to the first driven gear 108 for movement about the rotation axis 126. In other embodiments, the pin 116 may be integrally formed as a single component with the first driven gear 108. The illustrated pin 116 is received by the bushing 120 and includes an end 131 that extends beyond the bushing 120. The end 131 of the pin 116 is received in a channel 128 (FIG. 4B) of the second driven gear 112. As shown in FIG. 6, the illustrated channel 128 is a recessed track formed in a face 133 of the second driven gear 112 that faces the first driven gear 108. The recessed track is formed as a continuous circle or annulus in the face 133.

As shown in FIGS. 3A and 3B, the spindle 124 includes a yoke 180, a spindle shaft 184, and a blade clamp (not shown). The blade clamp is opposite the yoke 180. In the illustrated embodiment, the yoke 180 is integrally formed as a single piece with the spindle 124 such that the yoke 180 is part of the spindle 124. In other embodiments, the yoke 180 may be a separate piece that is secured to the spindle 124. As shown in FIG. 2, a tool element 192, such as a saw blade, is coupled to the spindle shaft 184 via the blade clamp. The blade clamp may include the blade clamp assembly shown and described in U.S. Pat. No. 6,725,548, entitled "Keyless Blade Clamp Mechanism" and issued Apr. 27, 2004, the contents of which are hereby incorporated by reference. The blade clamp can also be configured to accept a variety of reciprocating saw blades, jig saw blades, and/or hack saw blades.

With reference to FIGS. 3A, 3B, 7, and 8, the yoke 180 includes a body 132 with an aperture 136 extending therethrough. The body 132 also has a notch 140 formed in an outer periphery of the yoke 180. In the illustrated embodiment, the notch 140 is formed at an upper peripheral corner of the yoke 180 nearest the driving gear 104. The notch 140 removes material from the yoke 180 to provide clearance as the yoke 180 moves within the gear case. More particularly, the notch 140 allows the yoke 180 to translate rotation of the driven gears 108, 112 into reciprocating motion without having the yoke 180 contact the driving gear 104.

The aperture 136 receives the pin 116 and the bushing 120 (FIGS. 3A and 3B). In the illustrated embodiment, the aperture 136 is an elongated oval-shape. More specifically, the aperture 136 defines a first length 144 between arcuate sides 148, 152 and a second length 156 between substantially parallel sides 160, 164. The second length 156 is generally equal to the outer diameter of the bushing 120 so that the bushing 120 pushes (e.g., reciprocates) the yoke 180 forward and backward as the driven gears 108, 112 are rotated. The first length 144 is longer than the second length 156 and provides clearance for the pin 116 and the bushing 120 to move laterally within the aperture 136. The aperture 136 defines a longitudinal axis 172 extending along the first length 144. In the illustrated embodiment, the notch 140 is formed along an axis 168 in the outer perimeter of the yoke 180. The axis 168 is obliquely angled relative to the longitudinal axis 172 of the aperture 136. In some embodiments, the axis 168 of the notch 140 may be oriented at an angle $\pi$ between 45° and 75° relative to the longitudinal axis 172. In the illustrated embodiment, the angle $\pi$ is about 60°.

The spindle 124 and the saw blade 192 are positioned along a longitudinal spindle axis 196 defined along a length of the spindle 124. During operation of the saw 10, the spindle 124 translates back and forth (e.g., reciprocates) along the longitudinal axis 196. In the illustrated embodiment, the notch 140 is offset from the longitudinal axis 196 of the spindle 124. In particular, the notch 140 is formed in a corner of the yoke 180 so the yoke 180 is nonsymmetrical about both the longitudinal aperture axis 172 and the longitudinal spindle axis 196. As shown in FIGS. 3A and 3B, the output shaft 125 of the motor 68 is oriented at an oblique angle relative to the longitudinal spindle axis 196 so the driving gear 104 is positioned adjacent (i.e., nearest to) the corner of the yoke 180 with the notch 140. Moreover, the axis 168 of the notch 140 is obliquely angled relative to the longitudinal axis 196 of the spindle 124. In some embodiments, the axis 168 of the notch 140 may be oriented at an angle $\alpha$ between 15° and 45° relative to the longitudinal axis 196. In the illustrated embodiment, the angle $\alpha$ is about 30°.

In operation, the driving gear 104 is coupled to the output shaft 125 of the motor 68. As the output shaft 125 rotates, the pinion 104 rotates and engages teeth of the driven gears 108, 112 to rotate the gears 108, 112. The driven gears 108, 112 counterbalance each other as well as the spindle 124 to counterbalance the forces from the reciprocating motion of the spindle 124. Since the pin 116 is offset from the axis of rotation 126 of the driven gears 108, 112, the pin 116 moves around the axis of rotation 126 as the driven gears 108, 112 rotate. The pin 116 also moves within the aperture 136 of the yoke 180 to reciprocate the yoke 180 and the spindle 124. The notch 140 provides clearance for the pinion 104 during reciprocating motion to allow for an increased reciprocating stroke length.

When the drive system 100 is driving the tool element 192, the bushing 120 moves up and down along the pin 116. By defining the channel 128 (FIGS. 4B and 6) in the second driven gear 112 for the pin 116 and extending the length of the dive pin 116, the bushing 120 can move up and down between the first and the second driven gears 108, 112 and remain in contact with the pin 116. This arrangement helps reduce uneven wearing of the inner surface of the bushing 120.

In some embodiments, the saw 10 further includes multiple modes that allow the user to change the output reciprocating speed of the tool element 192. The modes may allow the change in reciprocating speed by adjusting the motor speed or by adjusting the physical gearing. Moreover, the user may change between the modes via an actuator on the housing, a remote device, or an application on a smart phone or tablet computer.

As shown in FIGS. 1 and 2, the saw 10 also includes a shoe assembly 200. The shoe assembly 200 is coupled to a front end of the housing 40 opposite from the battery pack 14. In the embodiment shown, the shoe assembly 200 is a movable (i.e., pivotable) shoe assembly. The shoe assembly 200 includes a front surface or plate 204 which engages or rests on a workpiece. The front plate 204 also defines an opening 208 for the tool element 192 to pass through. The front plate 204 is movably or pivotably coupled to two connecting members 212, which connect the shoe assembly 200 to the housing 40. The front plate 204 is pivotable about an axis 220. In other embodiments (not shown), the shoe assembly 200 may be an otherwise adjustable shoe assembly or a fixed show assembly.

Although the invention has been described in detail with reference to certain preferred embodiments, variations and modifications exist within the scope and spirit of one or more independent aspects of the invention as described.

Various features and advantages of the invention are set forth in the following claims.

What is claimed is:

1. A power tool comprising:
a housing having a handle configured to be grasped by a user;
a motor supported by the housing;
a driving gear rotated by the motor;
a driven gear engaging the driving gear to be rotated by the driving gear about a rotation axis;
a pin extending from the driven gear and offset from the rotation axis; and
a spindle having a yoke coupled to the pin to translate rotation of the driven gear into reciprocating motion of the spindle;
wherein a notch is formed in an outer periphery of the yoke to provide clearance for the driving gear as the spindle is driven by the pin,
wherein the driven gear is a first driven gear, and further comprising a second driven gear facing the first driven gear on an opposite side of the driving gear, wherein the yoke of the spindle is positioned between the first and the second driven gears,
wherein the pin extends through the spindle and is received by a channel in the second driven gear.

2. The power tool of claim 1, wherein the notch is formed along a first axis of the yoke, and wherein the yoke includes an aperture that receives the pin and defines a second longitudinal axis that is at an angle relative to the first axis.

3. The power tool of claim 2, wherein the angle ranges from between 45 degrees and 75 degrees.

4. The power tool of claim 2, wherein the spindle defines a third longitudinal axis that is at a second angle relative to the first axis.

5. The power tool of claim 2, wherein the aperture has a first length measured in a direction parallel to the second longitudinal axis and a second length measured in a direction perpendicular to the second longitudinal axis, and wherein the second length is shorter than the first length.

6. The power tool of claim 5, further comprising a bushing positioned in the aperture, the pin being received by the bushing.

7. The power tool of claim 6, wherein an outer diameter of the bushing is substantially equal to the second length.

8. A power tool comprising:
a housing having a handle configured to be grasped by a user;
a motor supported by the housing;
a driving gear rotated by the motor;
a first driven gear engaging the driving gear to be rotated by the driving gear about a rotation axis;
a second driven gear facing the first driven gear and engaging the driving gear to be rotated by the driving gear about the rotation axis, the second driven gear defining a channel;
a pin extending from the first driven gear and offset from the rotation axis, the pin having an end received in the channel of the second driven gear; and
a spindle having a yoke coupled to the pin to translate rotation of the first and second driven gears into reciprocating motion of the spindle.

9. The power tool of claim 8, wherein the first driven gear is a first bevel gear, and wherein the second driven gear is a second bevel gear.

10. The power tool of claim 8, wherein the spindle has a longitudinal axis, wherein the yoke defines an aperture that receives the pin, wherein the aperture has a first length measured in a direction perpendicular to the longitudinal axis and a second length measured in a direction parallel to the longitudinal axis, and wherein the second length is shorter than the first length.

11. The power tool of claim 10, further comprising a bushing positioned within the aperture of the yoke, the pin being received by the bushing.

12. The power tool of claim 8, wherein the channel is formed as a recessed track in a face of the second driven gear.

* * * * *